(12) United States Patent
Heil et al.

(10) Patent No.: US 6,862,980 B2
(45) Date of Patent: Mar. 8, 2005

(54) FOOD PRESERVATION CONTAINER AND FILTER

(75) Inventors: Ross Heil, Walnut Creek, CA (US); Massood Moshrefi, Dublin, CA (US); Robert Wilk, Sierra Village, CA (US)

(73) Assignee: Tilia International, Inc., San Francisco, CA (US)

( * ) Notice: Subject to any disclaimer, the term of this patent is extended or adjusted under 35 U.S.C. 154(b) by 2 days.

(21) Appl. No.: 10/418,964

(22) Filed: Apr. 18, 2003

(65) Prior Publication Data

US 2004/0011794 A1 Jan. 22, 2004

Related U.S. Application Data

(60) Provisional application No. 60/374,182, filed on Apr. 19, 2002.

(51) Int. Cl.[7] .......................... B65D 81/24; B65D 85/34; A01J 11/04
(52) U.S. Cl. ........................... 99/467; 99/472; 426/118; 426/395; 426/419; 206/213.1
(58) Field of Search ........................ 99/467, 472, 473, 99/474; 206/205, 213.1; 426/112, 118, 395, 419, 124; 210/238, 232, 470, 244, 246, 436, 454, 472; 55/359, 422, 490, 504

(56) References Cited

U.S. PATENT DOCUMENTS

| | | | |
|---|---|---|---|
| 3,049,399 A | 8/1962 | Gamson et al. | |
| 4,210,255 A | 7/1980 | Pan | |
| 4,412,630 A | 11/1983 | Daenen | |
| 4,427,110 A | * 1/1984 | Shaw, Jr. | 206/205 |
| 4,515,266 A | 5/1985 | Myers | |
| 4,660,355 A | 4/1987 | Kristen | |
| 4,676,371 A | 6/1987 | Byrne | |
| 4,756,422 A | 7/1988 | Kristen | |
| 4,941,310 A | 7/1990 | Kristen | |
| 4,949,847 A | 8/1990 | Nagata | |
| 5,278,112 A | 1/1994 | Klatte | |
| 5,363,978 A | 11/1994 | Molo | |
| D355,814 S | 2/1995 | VanValkenburg et al. | |
| 5,390,809 A | 2/1995 | Lin | |
| D365,251 S | 12/1995 | Lo | |
| 5,567,405 A | 10/1996 | Klatte et al. | |
| D389,012 S | 1/1998 | Miller | |
| 6,099,728 A | 8/2000 | Bairischer | |
| 6,468,332 B2 | * 10/2002 | Goglio et al. | 96/134 |
| D473,761 S | 4/2003 | Wilk et al. | |
| D478,774 S | 8/2003 | Wilk et al. | |

FOREIGN PATENT DOCUMENTS

WO    WO 03/088766 A1    10/2003

OTHER PUBLICATIONS

WO 94/26622 (Hamilton) Nov. 24, 1994.*

* cited by examiner

*Primary Examiner*—Reginald L. Alexander
(74) *Attorney, Agent, or Firm*—Perkins Coie LLP

(57) ABSTRACT

A filter for absorbing ethylene gas and moisture and emitting carbon dioxide that can be removably coupled to a container. The container can have vent openings to allow air to circulate to prevent excess condensation, or the container can be any type of flexible, semirigid, or rigid produce container such as a plastic bag, a refrigerator or a typical plastic container. The contents of the filter are in vapor contact with the internal environment of the container such that it can absorb ethylene gas and moisture in the container and release carbon dioxide into the container to retard the ripening process of the produce stored in the container.

39 Claims, 10 Drawing Sheets

FOOD PRESERVATION CONTAINER AND FILTER

CLAIM OF PRIORITY

This application claims benefit to U.S. Provisional Application No. 60/374,182, filed Apr. 19, 2002, which is hereby incorporated by reference in its entirety.

CROSS REFERENCE TO RELATED APPLICATIONS

This application is related to the following applications which are each hereby incorporated by reference in their entirety:

U.S. Design Application No. 29/159,434, COMBINED FOOD PRESERVATION CANISTER AND FILTER, Inventors: Robert Wilk et al., filed on Apr. 19, 2002, now Patent No. D473,761. (TILA-1126US2)

U.S. Design Application No. 29/164,799, FOOD PRESERVATION FILTER, Inventors: Robert Wilk et al., filed on Jul. 31, 2002, now Patent No. D478,774. (TILA-1126USA)

FIELD OF THE INVENTION

This invention relates generally to food storage containers.

BACKGROUND OF THE INVENTION

In storing food in the household, the primary concern is maintaining freshness of the food. To maintain freshness, two main methods have been employed. The first is refrigeration, and the second is containment. These are typically, but not necessarily, used together for maximum effectiveness. More recently, ethylene gas absorbing compounds have been employed to control ripening of produce.

Refrigeration is the provision of a reduced temperature environment. This reduced temperature environment reduces the grown rate of bacteria and other organisms, slowing their degradation of stored food in a well known manner.

Containment of food in an effort to maintain freshness typically involves sealing the food against air exchange with the ambient environment, preferably at a pressure below atmospheric pressure. This has been achieved in numerous ways, such as by encasement within carefully folded aluminum foil, encasement within plastic bags which may be sealed and possibly evacuated, or placement within a plastic container having an air-tight seal and possibly evacuating air from within the container. Examples of such containment systems include U.S. Pat. Nos. 4,660,355, 4,756,422 and 4,941,310, the assignee of these patents being the assignee of the present patent.

While these storage methods work well for certain foods, it has been found that they are not the best storage method for all produce. Specifically, sealed container storage methods are not best for fresh produce which continues to live for some time after harvest. Since certain produce continues to live after harvest, the produce continues to respirate and produce other gases, including ethylene. Further, the trauma induced by harvest can cause the respiration rate of the produce to increase, sometimes dramatically, over the normal respiration rate of produce in the field. Relatively prolonged exposure to an excessive concentration of the respiration byproducts, particularly ethylene gas, can degrade the appearance, flavor, texture, and other aspects of the produce.

Sealing produce against air exchange, as described above, may simply trap the respiration gasses with the produce and unless the seal is periodically broken to permit air exchange, buildup of an excessive concentration will occur, accelerating the degradation of the produce. Additionally, due to loss of moisture by the produce and ambient moisture in the air, condensation readily can occur inside sealed containers. To prevent this, several containers for produce have provided for gas exchange.

A first example is shown in U.S. Pat. No. 4,676,371 to Byrne. Byrne describes a produce storage container formed of an air-impervious material, but having several gas exchange openings. The openings are formed in a base of the container, and a lid is provided to close the top of this base. A second example is a product sold by TEFAL S. A. under the model name "la legumiere". This product includes a base formed of an air impervious material, and having a lid. The lid is also formed of an air impervious material, but includes a pair of apertures extending therethrough and a sliding gate which may be manually moved to selectively block one of these apertures. The aperture may not be closed in a gas-tight manner, but does include a filter to prevent ingress of contaminants. Both of these containers may be used within a household refrigerator to increase the freshness of the produce through refrigeration.

To prevent degradation of produce due to exposure to ethylene gas, ethylene gas absorbers have been developed. Such ethylene gas absorbers, as described in U.S. Pat. No. 5,278,112 to Klatte, the full text of which is hereby incorporated herein by reference, describe the use of potassium permanganate impregnated Zeolite crystals to absorb ethylene gas. However, this chemical absorption of ethylene gas has primarily been used only by produce harvesting and transport companies to maintain the condition of produce while it is brought to the consumer. Such ethylene gas control products have not been readily available to the consumer.

Ethylene gas contributes to the ripening process by binding to a receptor site on the plant cell membrane which causes a chemical message to be transferred to the cell nucleus in a known manner. The DNA in the nucleus begins creating RNA that eventually results in the synthesis of the enzymes which cause the particular produce to ripen and eventually spoil. It is well known to those skilled in the art that the impact of ethylene gas on the ripening process is reduced if the atmosphere surrounding the produce has a carbon dioxide concentration above approximately one percent or the surrounding atmosphere has an oxygen content below approximately eight percent. Presently, there are no consumer products that utilize atmosphere modification to control the effect of ethylene gas on produce.

SUMMARY OF THE INVENTION

An embodiment of the inventive container of the invention is a non-refrigerator or a refrigerated container that allows a minimal amount of gas exchange to occur with the exterior environment to prevent condensation.

In another aspect, the container also includes a filter which is removably coupled to the container.

In a further aspect, the filter is comprised of two different materials that can be, if desired, contained in two chambers of the filter.

In still a further aspect, the chambers hold mixes that extend the shelf life of fruits and vegetables.

Still further, the underside of the filter that is exposed to the inside of the container is made of Tyvek® or similar type material which is a moisture barrier. In still a further aspect, one of the chambers of the filter holds an ethylene control compound such as potassium permanganate impregnated material preferably a porous or multi-channeled material and the other chamber holds moisture absorbing, and $CO_2$ generating compounds such as a combination of calcium chloride and citric acid and sodium bicarbonate. In one embodiment, the filter fits on the lid (or on the side, top and bottom) of a container or on the lid (on or the side, top and bottom) of a chamber on compartment built into a refrigerator or other appliances.

DETAILED DESCRIPTION

The details of the present invention will be explained with reference to FIGS. 1–12.

Figure 1:
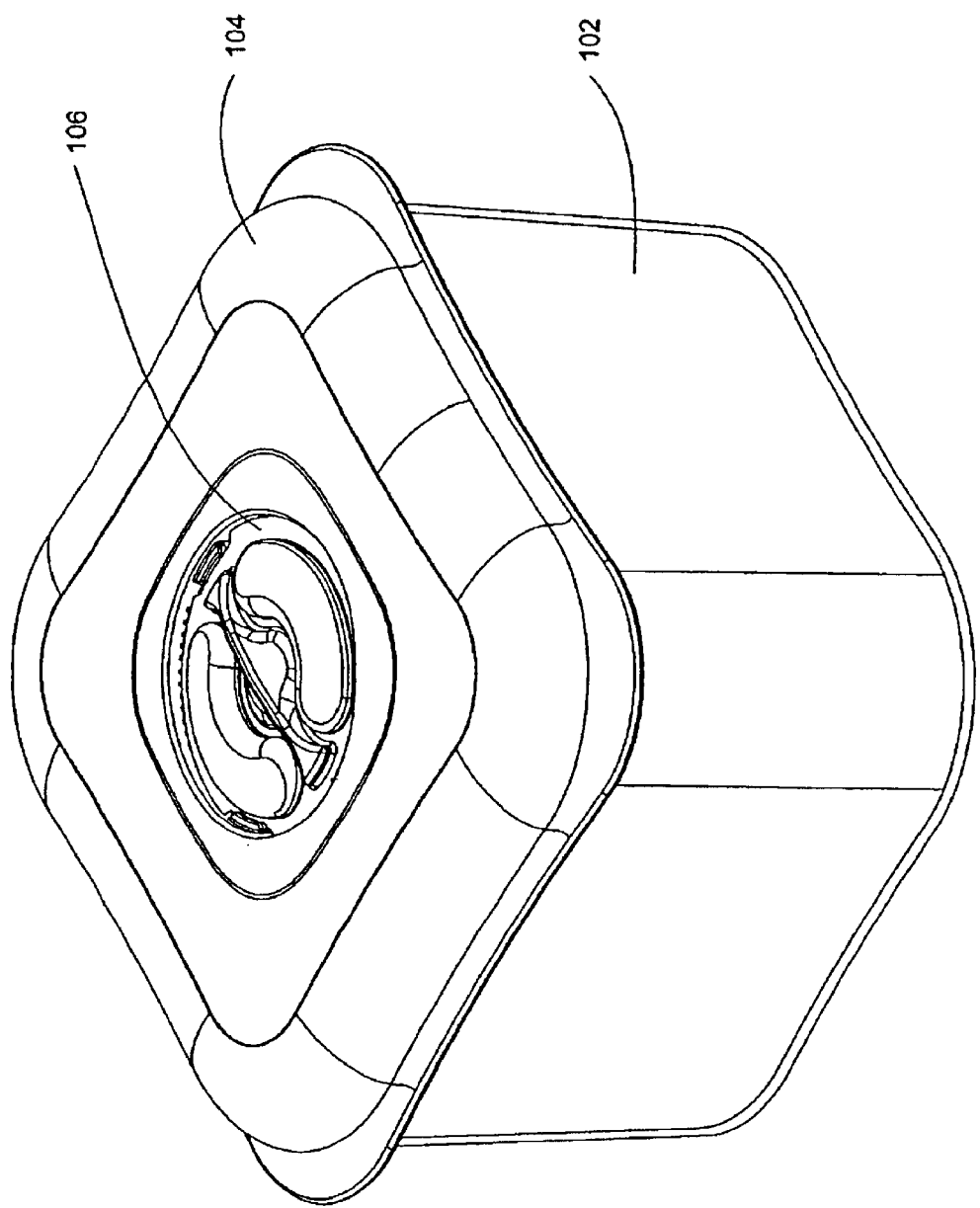
FIG. 1 is a perspective drawing showing an embodiment of a container of the invention with an embodiment of a sealed lid and filter of the invention inserted in the lid.

FIG. 1 shows is a perspective view of a complete storage container 100. The container includes a container base 102, a lid 104 and a filter 106. The filter 106 and the lid 104 are designed to mate together such that the filter 106 cannot be removed from or inserted into the lid 104 without user intervention.

Figure 2:
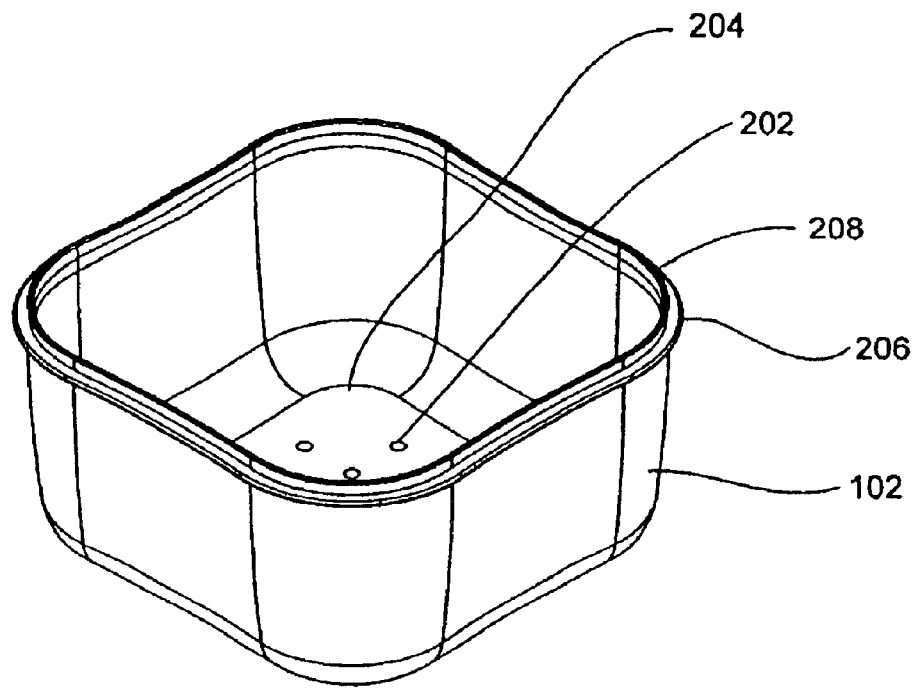
FIG. 2 is a perspective view of the container base shown in FIG. 1.

FIG. 2 shows a perspective view of the container base 102. The container base 102 includes air circulation protrusions 202 on its interior bottom surface 204. The circulation protrusions 202 are designed to elevate the contents (not shown) of the container base 102 from the interior bottom surface 204. By elevating the contents (not shown) of the container base from the interior bottom surface 204, air is able to circulate on the underside of the contents (not shown) of the container. The air circulation protrusions 202 shown in FIG. 2 are semi-spherical, however any shape protrusion may be used that elevates the contents (not shown) of the container base 102 from the interior bottom surface 204 and allows air to circulate on the underside of the contents (not shown) of the container base 102. Additionally, as an alternate to providing air circulation protrusions 202 of the interior bottom surface 204 of the container base 102, the container base 102 may be formed having ridges (not shown) or having an other suitable form such that air can freely circulate beneath the contents (not shown) of the container base 102.

The container base 102 shown in FIG. 2 also includes an opening edge 206. The opening edge 206 has a mating flange 208. In the embodiment shown in FIG. 2, the mating flange 208 extends upward from the opening edge 206. The mating flange 208 is designed to mate with a receiving edge (not shown) of the lid 104 to removably couple the lid 104 to the container base 102 in a substantially air tight manner. Although FIG. 2 depicts the container base 102 having a mating flange 208 that extends upward from the opening edge 206 to mate with the lid 104, alternate sealing mechanisms may be used to removably couple the lid 104 to the container base 102. Furthermore, while the mating flange 208 shown in FIG. 2 is designed to mate with lid 104 in a substantially air tight manner, alternate embodiments are possible. Alternate sealing mechanisms that designed to couple the container base 102 to the lid 104 which do not form a substantially air tight seal may be used.

Figure 3:
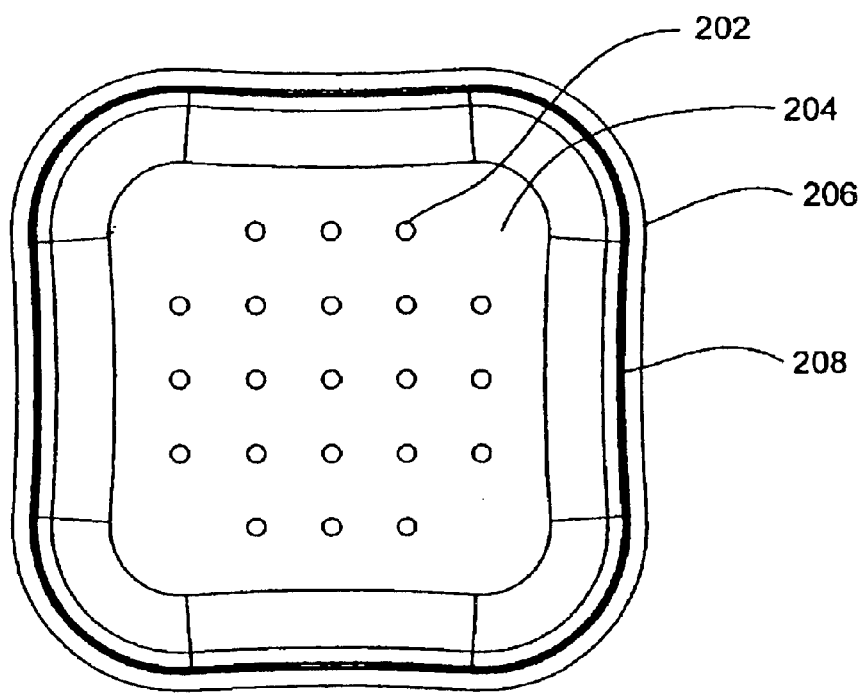
FIG. 3 is a plan view of the interior of the container base shown in FIG. 2.

FIG. 3 is a plan view of the interior of the container base shown in FIG. 2. FIG. 3 shows that the circulation protrusions 202 are spaced apart in a uniform pattern, however alternate embodiments are possible. Any pattern (random or uniform) of circulation protrusions 202 or any pattern (random or uniform) of deformation of the interior bottom surface 204 may be used.

In addition to showing the circulation protrusions, FIG. 3 further shows the opening edge 206 and the mating flange 208.

Figure 4:
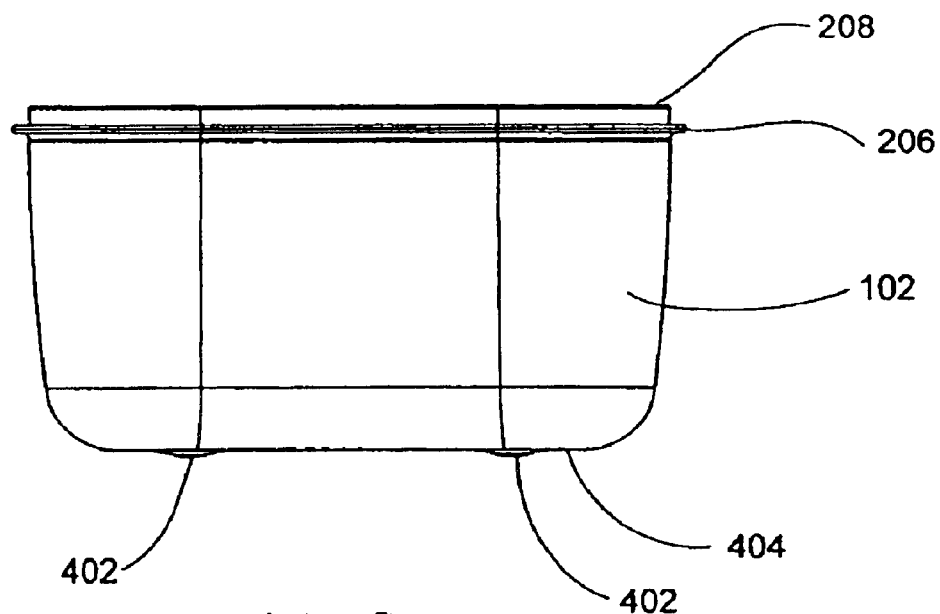
FIG. 4 is an elevation view of the exterior of the container base shown in FIG. 2

FIG. 4 is an elevation view of the exterior of the container base 102. FIG. 4 shows the opening edge 206 and the mating flange 208. FIG. 4 also shows base supports 402 located on the lower exterior surface 404 of the container base 102. The base supports 402 are designed to elevate the lower exterior surface 404 from whatever surface the container base 102 is resting upon and allow air to circulate under the container base 102.

Figure 5:
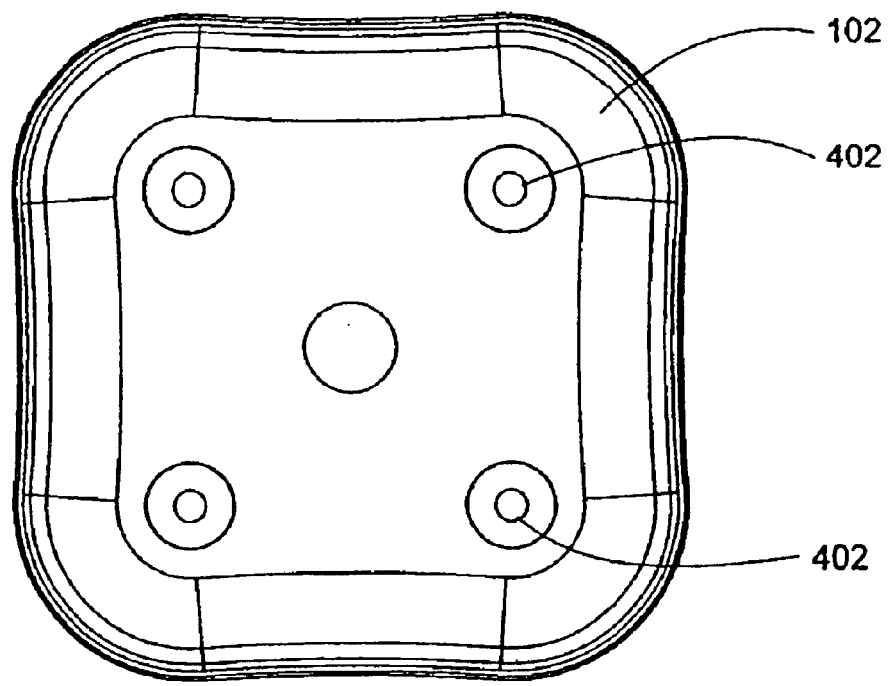
FIG. 5 is a view of the exterior bottom of base of the container base shown in FIG. 2

FIG. 5 shows a plan view of the lower exterior surface 404 of the container base 102. FIG. 5 shows four base supports 402 that are truncated semi-spheres uniformly spaced on the lower exterior surface 404 of the container base 102, however in alternate embodiment alternate shapes may be employed and alternate spacings are possible. The size, shape, quantity and location of the base supports 402 may be varied in alternate embodiments.

Figure 6:
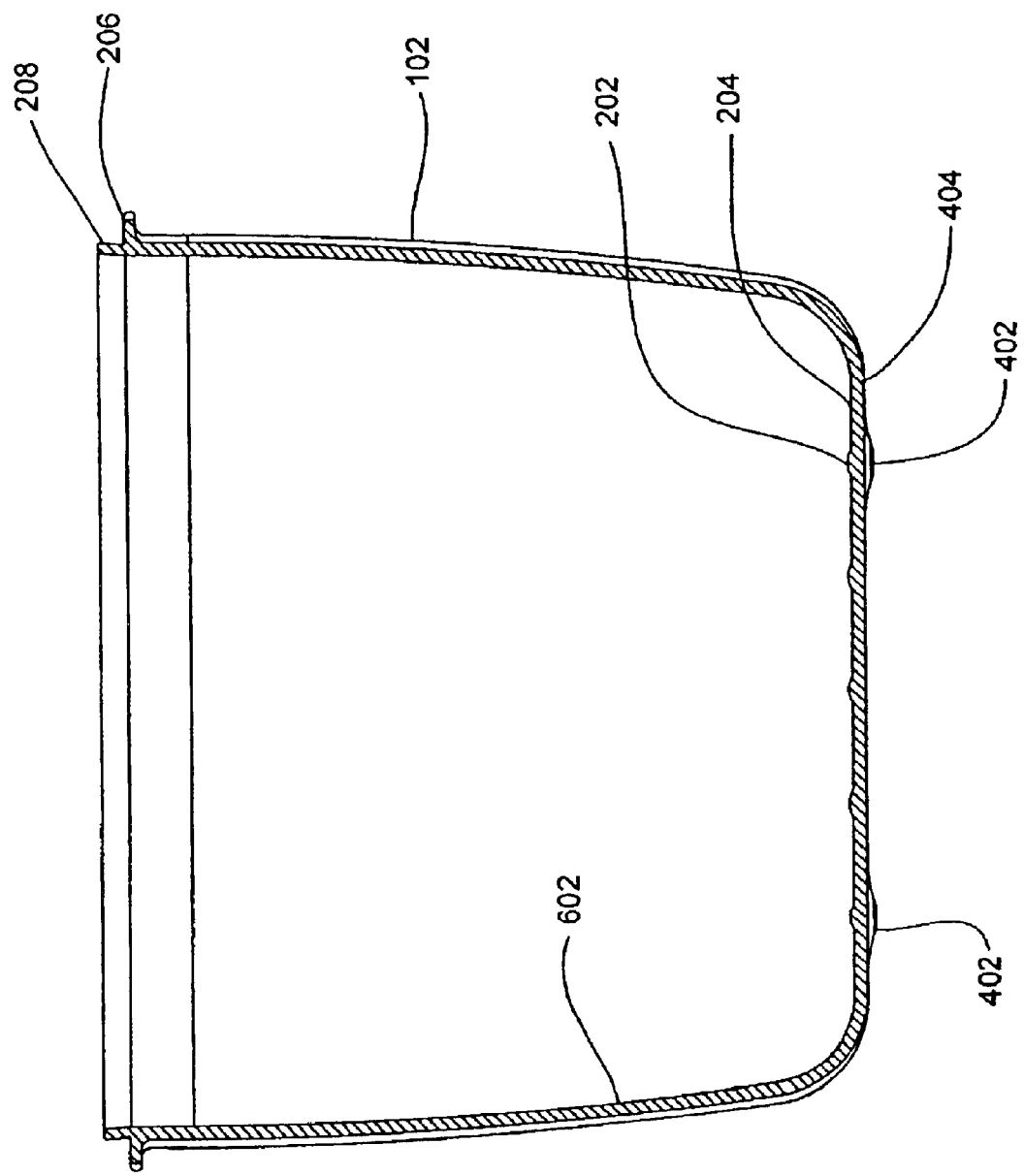
FIG. 6 is a sectional elevation view of the container base shown in FIG. 2

FIG. 6 shows a cross-sectional elevation of the container base shown in FIG. 1. FIG. 6 shows the base supports 402 on the lower exterior surface, circulation protrusions 202 located on the interior bottom surface 204, the opening edge 206 and the mating flange 208 extending upward from the opening edge 206. FIG. 6 also specifically shows the interior walls 602 of the container base 102. The interior walls 602 of the container base 102 are not vertical. The interior walls 602 of the container base 102 are sloped inward to meet the interior bottom surface 204 and the connection of the interior walls 602 to the interior bottom surface 204 is radiused such that any fluid coming into contact with the interior walls 602 will flow down the interior walls and collect on the interior bottom surface 204. Since the contents (not shown) of the container base 102 is elevated on the circulation protrusions 202, the contents (not shown) will not be in contact with any collected fluid until a substantial amount of fluid has collected on the interior bottom surface 204. The amount of fluid that can be collected on the interior bottom surface 204 prior to the contents (not shown) coming into contact with the fluid is a design choice. Unless otherwise noted, container base and container lid are comprised of a rigid or flexible plastic as is known in the trade for such food and general storage container.

Figure 7:
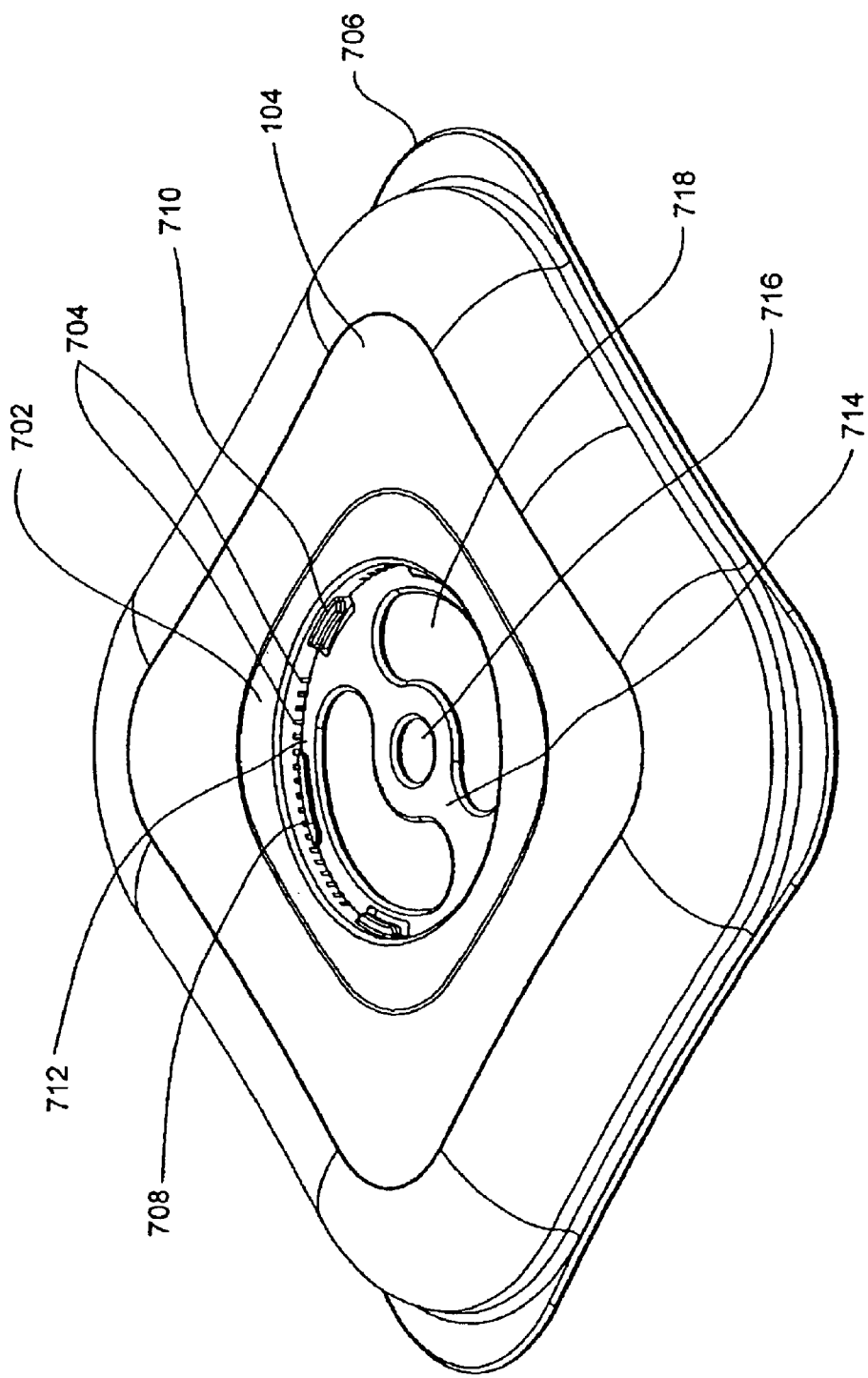
FIG. 7 is a perspective view of an embodiment of the lid of the invention of the container shown in FIG. 1 with the filter removed.

FIG. 7 is a perspective view of the lid 104 of the container shown in FIG. 1. The lid 104 includes a filter opening 702, a plurality of ventilation openings 704 and removal overhangs 706. In a preferred embodiment, the ventilation openings 704 are somewhat rectangular with their longitudinal axis oriented in a vertical direction. The filter opening 702 extends through the lid 104 and includes registration protrusions 708 and filter retention flanges 710. A filter (not shown) inserted into the filter opening shown in FIG. 7 is supported by the perimeter seating lip 712 and the bisecting support member 714 that traverses the filter opening 702. The support member 714 has an inverse hour-glass shape and has a circular cut out 716 located approximately at the center of the filter opening 702. The configuration of the filter opening 702 and the support member 714 creates two kidney-shaped openings 718 within the filter opening 702. However, this configuration is simply a design choice. Any configuration of the filter opening 702 that allows gas to flow through the filter opening 702 in the lid 104 may be used. Specific alternate embodiments include a grid layout of multiple fine members bisecting the filter opening 702 such that a mesh or spider web-type support structure is formed in the filter opening 702.

The registration protrusions 708 are designed to align a filter (not shown) within the filter opening 702. In the embodiment shown in FIG. 7, the registration protrusions are integrated into the perimeter seating lip 712, however alternate embodiments are possible. The registration protrusions may be formed in any manner that will allow the filter (not shown) to be properly aligned within the filter opening. In alternate embodiments, the registration protrusions 708 may be omitted and the filter (not shown) need not be aligned. In still further alternate embodiments, alignment markings may be placed on the filter (not shown) and the lid 104 which would allow a user to align the filter based on aligning the markings on the filter with the markings on the lid.

In the embodiment shown in FIG. 7, a filter (not shown) is inserted into the filter opening 702 and rotate into position such that slots on the filter (not shown) mate with the registration protrusions 708. When the filter (not shown) is limited seated and registered with the registration protrusions, the filter (not shown) is limited from moving vertically relative to the filter opening 702 by the filter retention flanges 710 which rest on or above the edge of the filter (not shown). In another embodiment the retention flanges 710 can prevent most if not all vertical movement of the filter. In the embodiments shown in FIG. 7, the filter retention flanges 710 extend from the interior wall of the filter opening 702 towards the center of the filter opening 702, however alternate embodiments are possible. In alternate embodiments, the filter retention flanges 710 may be coupled with the upper surface of the lid 104 or any other portion of the lid 104. In still further alternate embodiments, the filter retention flanges 710 may be omitted and alternate methods may be used to prevent the filter (not shown) from moving relative to the lid 104, such as temporary adhesive, Velcro® or the like.

The lid shown in FIG. 7 also includes a plurality of ventilation openings 704 located on the vertical wall of the filter opening 702. The ventilation openings 704 allow gas exchange between the contents of the container (not shown) and the exterior environment. The location, shape and quantity of the ventilation openings 704 may be selected as is convenient, however these parameters may be specified to limit the amount of gas exchange. Specifically, in alternate embodiments, the ventilation openings may be locate on the container base or may be omitted.

Figure 8A:
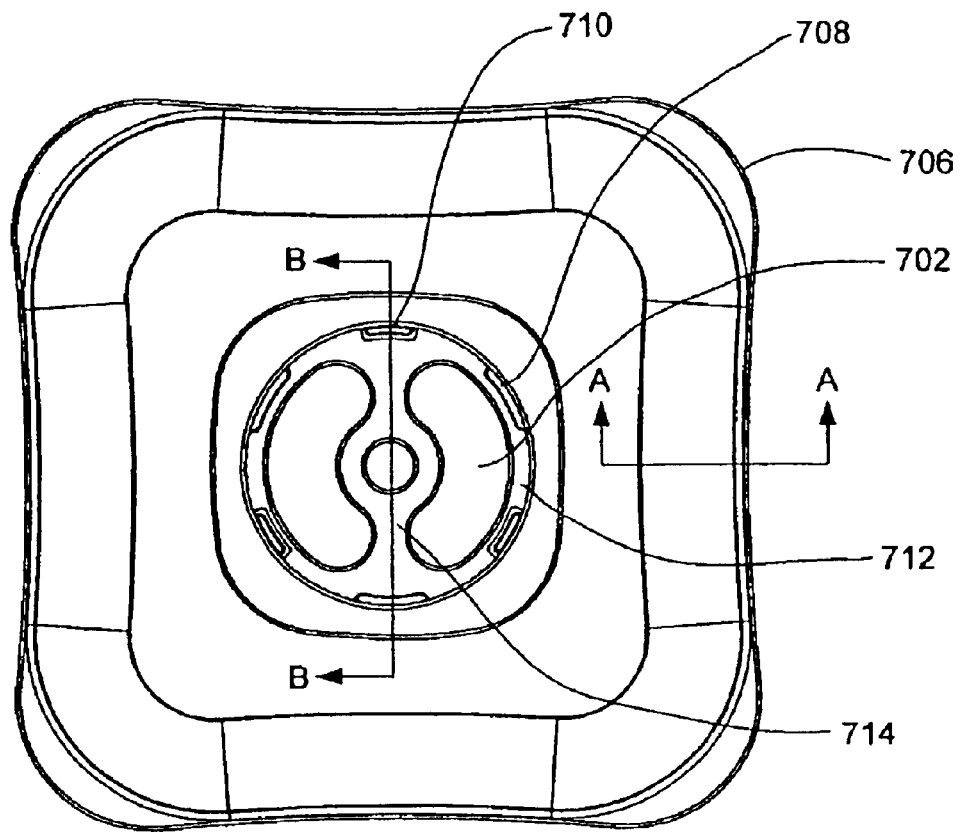
FIGS. 8A, 8B and 8C are plan, and sectional views of the embodiment of the lid shown in FIG. 7.

FIG. 8A is a plan view of the lid 104 shown in FIG. 7. FIG. 8A shows four removal overhangs 706, the filter opening 702 with two kidney shaped openings, three registration protrusions 708 and three filter retention flanges 710. As shown in FIG. 8A, the three filter retention flanges 710 have slightly smaller dimensions than the registration protrusions 708 such that a filter (not shown) having registration slots at its edge can be inserted in the filter opening 702 with the slots aligned with the filter retention flanges 710. The filter (not shown) can then be rotated such that the edge of the filter (not shown) is underneath the filter retention flanges 710. The filter (not shown) is rotated until the registration slots of the filter (not shown) are aligned with the registration protrusions 708 and the filter drops onto the perimeter seating lip and the support member 714. The registration protrusions 708 inhibit rotation of the filter (not shown) relative to the lid 104 and the filter retention flanges 710 inhibit vertical movement of the filter (not shown) relative to the lid 104. To remove the filter (not shown) the filter is rotated until the registration slots of the filter (not shown) are aligned with the filter retention flanges 710 and the filter is lifted out of the filter opening 702. Although the filter opening 702 is shown having three registration protrusions 708 and filter retention flanges, alternate embodiments are possible. As noted above with regard to FIG. 7, alternate methods of alignment other than registration protrusions 708 may be used to align the filter (not shown) and alternate filter opening 702 configurations are contemplated in which the filter (not shown) is not aligned in any particular orientation relative to the filter opening 702. Additionally, alternate embodiments are contemplated in which both a fewer number and a greater number of both registration protrusions 708 and filter retention flanges 710 are used. Specifically, in alternate embodiments, only one or two registration protrusions are used to align a filter (not shown) within the filter opening 702 and only two filter retention flanges 710 are used to restrict vertical movement of the filter (not shown) relative to the lid 104.

In yet another embodiment, the filter has three registration slots and the filter opening has three filter retention flanges, but only one registration protrusion 708. In a similar embodiment, the filter has three registration slots and the filter opening has three filter retention flanges, but there are only two registration protrusions 708. In yet another similar embodiment, the filter has two registration slots and the filter opening has three filter retention flanges and there are only two registration protrusions 708. In this embodiment, the edge of the filter (not shown) is slid under one of the filter retention flanges 710 and the two registration slots on the filter (not shown) are aligned with the two filter retention flanges 710. The filter (not shown) is lowered into the filter opening 702 and rotated until the two registration slots on edge of the filter (not shown) align with the registration protrusions 708. The embodiments presented above are by way of example only and are not intended to limit the scope of possible engagement and registration mechanisms for mating of the filter to the filter opening. In addition to the embodiments described above, numerous other embodiments will be apparent to those skilled in the art.

FIG. 8A also shows removal overhangs 706. The shape and location of the removal overhangs is exemplary and such overhangs may be located in other convenient location. The removal overhangs 706 are intended to make removal of the lid 104 from the container base 102 easier for a user.

Figure 8B:
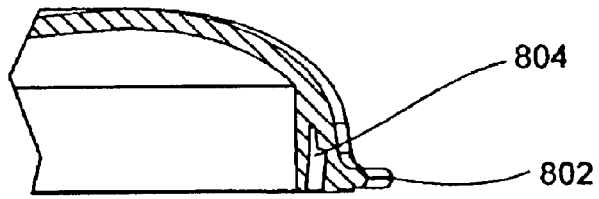

FIG. 8B is the partial sectional view of the edge 802 of the lid 104 indicated by the section marks A—A in FIG. 8A. FIG. 8B shows the edge 802 of the lid 104 and an mating slot 804 designed to mate with the mating flange 208 of the container base 102. In the embodiment shown in FIG. 8B, the mating slot runs around the complete perimeter of the lid. However, alternate embodiments are contemplated in which either the mating slot or the mating flange are not continuous around the perimeter. In the embodiment shown in FIG. 8B, the mating slot 804 is larger at it opening and narrower at its apex. It is formed in this tapered manner to simplify alignment of the mating flange 208 with the mating slot 804 however alternate formations are possible. In the embodiment shown in FIG. 8B, when a user applies pressure to the lid 104 and the mating slot 804 is properly aligned with the mating flange 208 of the container base, the mating flange 208 is driven up into the narrow portion of the mating slot 804 thus removably coupling the lid 104 to the container base 102. However, alternate methods and schemes of coupling the container base 102 to the lid 104 are possible. The lid 104 may be removably coupled to the container base 102 in any manner.

Figure 8C:
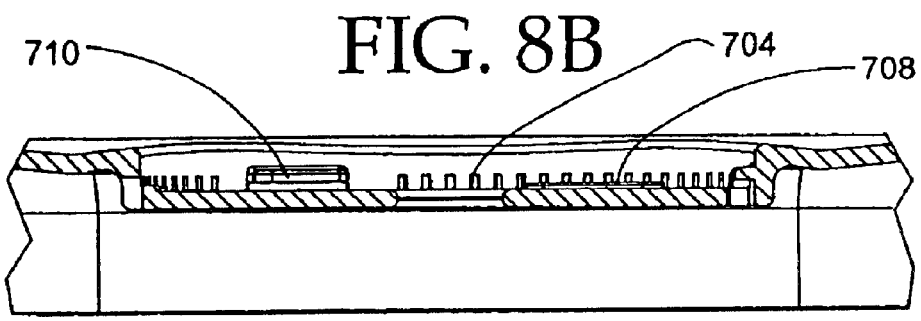

FIG. 8C is the partial sectional view of the filter opening 702 in the lid 104 indicated by the section marks B—B in FIG. 8A. FIG. 8C shows the ventilation openings 704, the registration protrusions 708 and the filter retention flanges 710. In the embodiment shown in FIG. 8C, the registration protrusions 708 are lower within the filter opening 702 than the filter retention flanges 710. However, as noted above with regards to FIGS. 7 and 8A alternate embodiments are contemplated.

Figure 9:
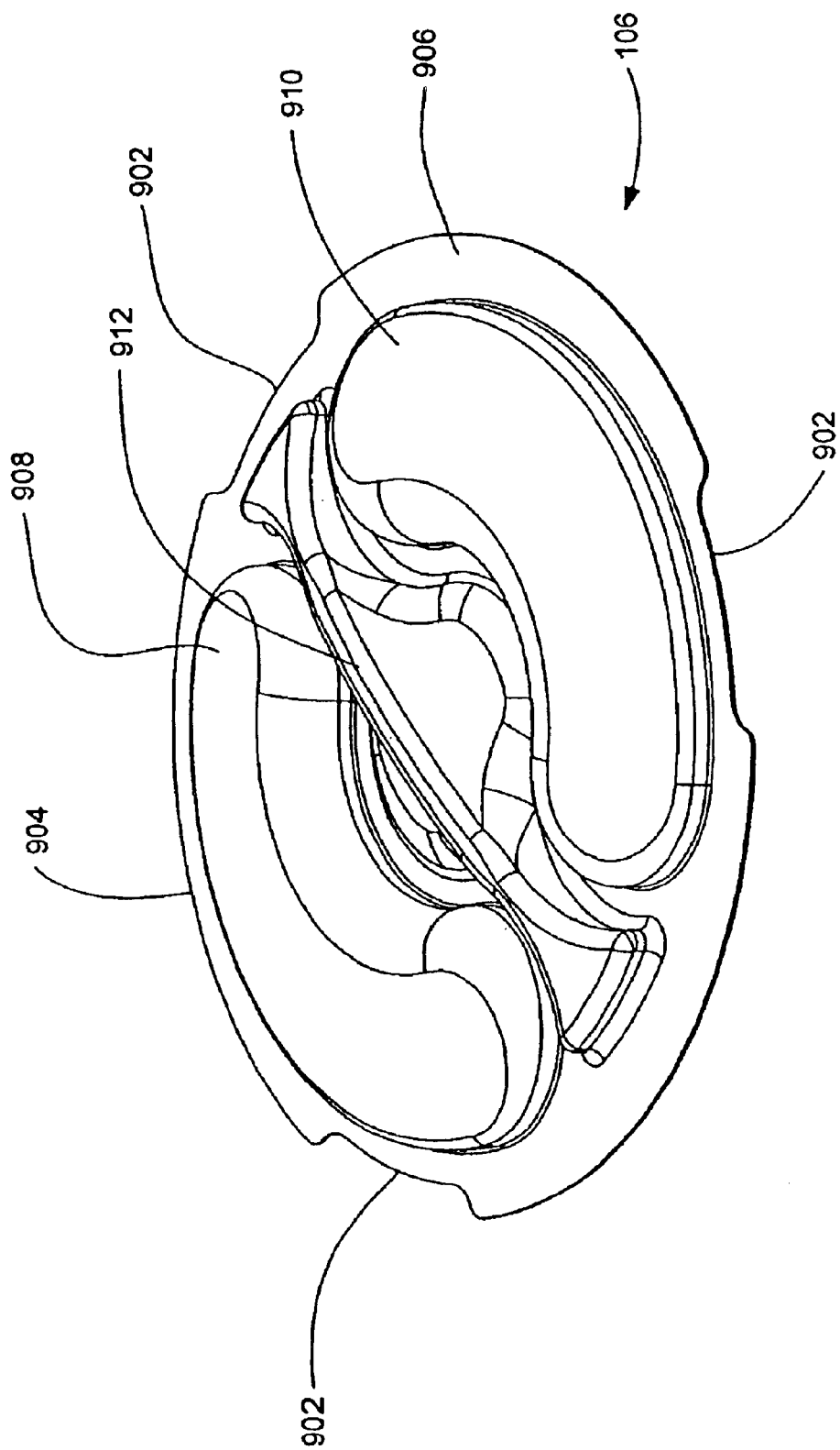
FIG. 9 is a perspective view of an embodiment of the filter of the invention shown in FIG. 1.

FIG. 9 is a perspective view of a filter 106. The filter 106 shown in FIG. 9 is substantially circular with three registration slots 902 in its edge 904. As described above with reference to FIGS. 7, 8A and 8C, the registration slots 902 are designed to allow the filter 106 to be lowered into the filter opening 702 in the lid 104 with the registration slots 902 aligned with the filter retention flanges and rotated with the edge 904 of the filter under the filter retention flanges 710 until the registration slots 902 are aligned with the registration protrusions 708 of the filter opening 702. As noted above with reference to FIGS. 7A, 8A and 8C, alternate registration and filter retention mechanisms are possible.

The filter shown in FIG. 9 is comprised of an upper portion 906 and a lower portion (not shown). The upper portion 906 is formed having two kidney-shaped chambers 908 910. However, the shape of the chambers can have other variations and be within the spirit and scope of the invention. The two chambers are intended to contain two independent compounds—the first for ethylene gas control and the second for moisture absorption and carbon dioxide production. The composition of the compounds and methods of manufacturing the compounds will be explored in detail later in this application. In the embodiment shown in FIG. 9, the two compounds are contained in separate chambers, however in alternate embodiments both compounds may be contained in one chamber.

The upper portion 906 of the filter 106 also includes a handle 912. In the embodiment shown in FIG. 9, the handle 912 is integrated into the upper portion 906 of the filter 106, however a multicomponent arrangement is possible. The handle 912 may take any convenient shape and may be attached to or removable attached to the upper portion 906 of the filter 106 in any convenient manner.

The upper portion 906 of the filter 106 shown in FIG. 9 is comprised of a molded or vacuum formed plastic. However, in alternate embodiments the upper portion 906 of the filter 106 may be made of any convenient material. The lower portion (not shown) is the portion of the filter 106 that is exposed to the interior of the container base 102. The lower portion (not shown) of the filter is a fluid barrier that is vapor permeable. In the embodiment shown in FIG. 9, the lower portion or covering (not shown) is Tyvek® which allows vapor to pass through it, but prevents water from passing through it. Although Tyvek® is used as the lower portion or covering (not shown) in the embodiment shown in FIG. 9, alternate materials that allow vapor to pass through them, but not water are contemplated. The lower portion (not shown) of the filter 106 allows ethylene that is released from the contents (not shown) of the container to pass through the lower portion (not shown) of the filter 106 and be absorbed by the ethylene gas absorbing compound. In addition, the lower portion (not shown) of the filter 106 allows water vapor contained in the container to pass through the lower portion (not shown) and be absorbed by the moisture absorber. Furthermore, the lower portion (not shown) allows carbon dioxide generated in the filter to pass through the lower portion (not shown) of the filter and into the container to which the filter 106 is attached The lower portion (not shown) is sealed to the upper portion 906 of the filter 106 such that fluid cannot pass out of the filter 106 and such that fluid contained in the first chamber 908 cannot pass to the second chamber 910. However, in alternate embodiments, the seal between the first and second chambers 908 910 is not present. Additionally, in still further alternate embodiments in which there is only one chamber containing both compounds, the lower portion (not shown) is sealed to the upper portion 906 only at the edge 904 of the filter 106.

Figure 10A:
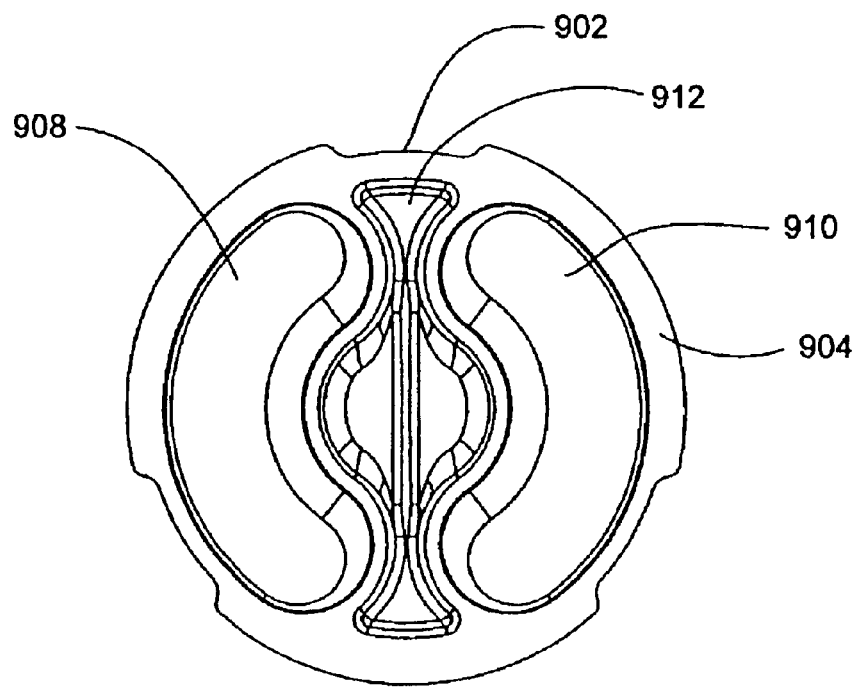
FIGS. 10A, 10B and 10C are plan and elevation views of the embodiment of the filter shown in FIG. 9.

FIG. 10A is a plan view of the top of the filter 106 shown in FIG. 9. Specifically, FIG. 10A shows the two chambers 908 910, the handle 912 and the edge 904 of the filter 106 with three registration slots 902.

Figure 10B:
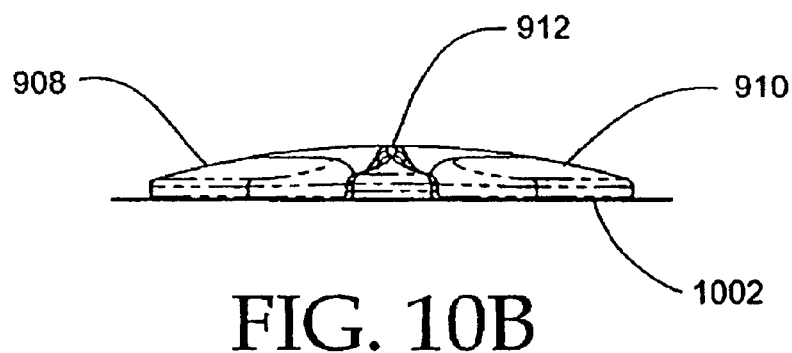

FIG. 10B is a first elevation of the filter 106 shown in FIG. 10A. FIG. 10B shows a preferred embodiment where the handle 912 protrudes slightly above the two chambers 908 910. As noted above with reference to FIG. 9, there are numerous alternate design choices for the handle 912. FIG. 10B further shows that the two chambers 908 910 extend upward only. That is in the embodiment shown in FIG. 10B, the lower portion 1002 of the filter 106 is substantially flat. However, in alternate embodiments the lower portion 1002 of the filter 106 may have alternate forms.

FIG. 10B also shows the edge 904 of the filter 106 which, in one embodiment, is used to removably connect the filter 106 to the lid 104 via the filter retention flanges 710.

Figure 10C:
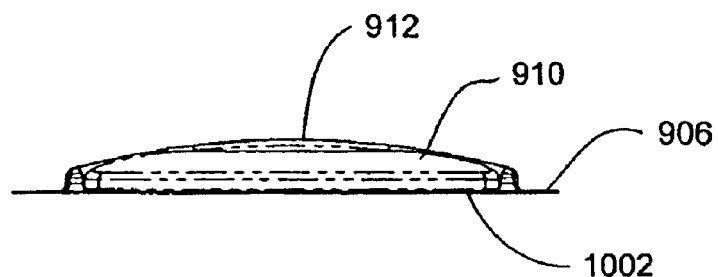

FIG. 10C is a second elevation of the filter 106 shown in FIG. 10A. FIG. 10C shows the handle 912, one chamber 908, the lower portion or covering 1002 of the filter 106 and the edge 904 of the filter 106.

Figure 11:
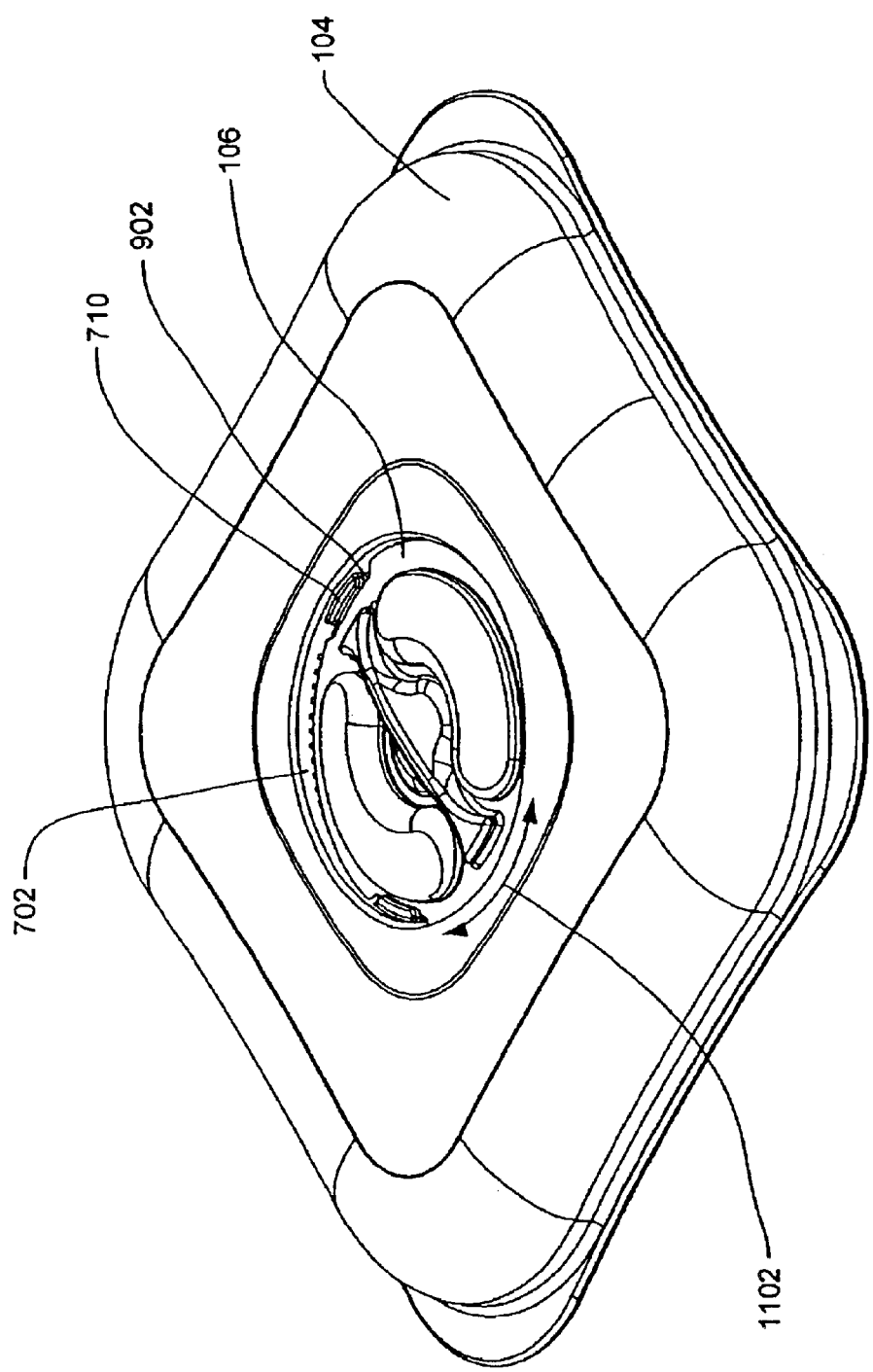
FIG. 11 is a perspective view of the lid of the container shown in FIG. 1 with the filter inserted.

FIG. 11 is a perspective view of the lid 104 shown in FIG. 1 with the filter 106 inserted in the filter opening 702. The filter 106 is inserted in the filter opening 702 such that the registration slots 902 of the filter 106 are aligned with the filter retention flanges 710. The lower portion (not shown) of the edge 904 of the filter 106 is resting on the registration protrusions (not shown). The filter 106 may be rotated in a clockwise or counterclockwise direction 1102 such that the upper portion 906 of the edge 904 of the filter 106 slides under the filter retention flanges 710. When the filter 106 is rotated such that the registration slots 902 are aligned with the registration protrusions (not shown), the filter 106 will seat on the support member (not shown) and the perimeter seating lip 712 (not shown). In this position the kidney shaped chambers are aligned with the kidney shaped openings on the lid. It is again to be understood that the chamber and/or the openings can have other shapes such as being comprised of one or more wedge shapes or semi-circular shapes.

In an alternate embodiments, the filter opening 702 may be incorporate into a flexible container such as a plastic bag. The filter opening 702 on the plastic bag would be capable of receiving a filter 106 in the manner described above with regards to FIGS. 7–10. In still further alternate embodiments, a refrigerator and/or a refrigerator compartment may be equipped with a filter opening 702 designed to receive a filter 106 as described above. In a more specific embodiment, the produce containment compartment of a refrigerator may have a filter opening 702 that is designed to receive a filter as described above with regards to FIGS. 7–10. The filter opening may be located on any convenient surface of the produce containment compartment. Based on the above description, it will be readily apparent to those skilled in the art that a filter opening capable or receiving a filter may be incorporated into virtually any containment device.

Figure 12:
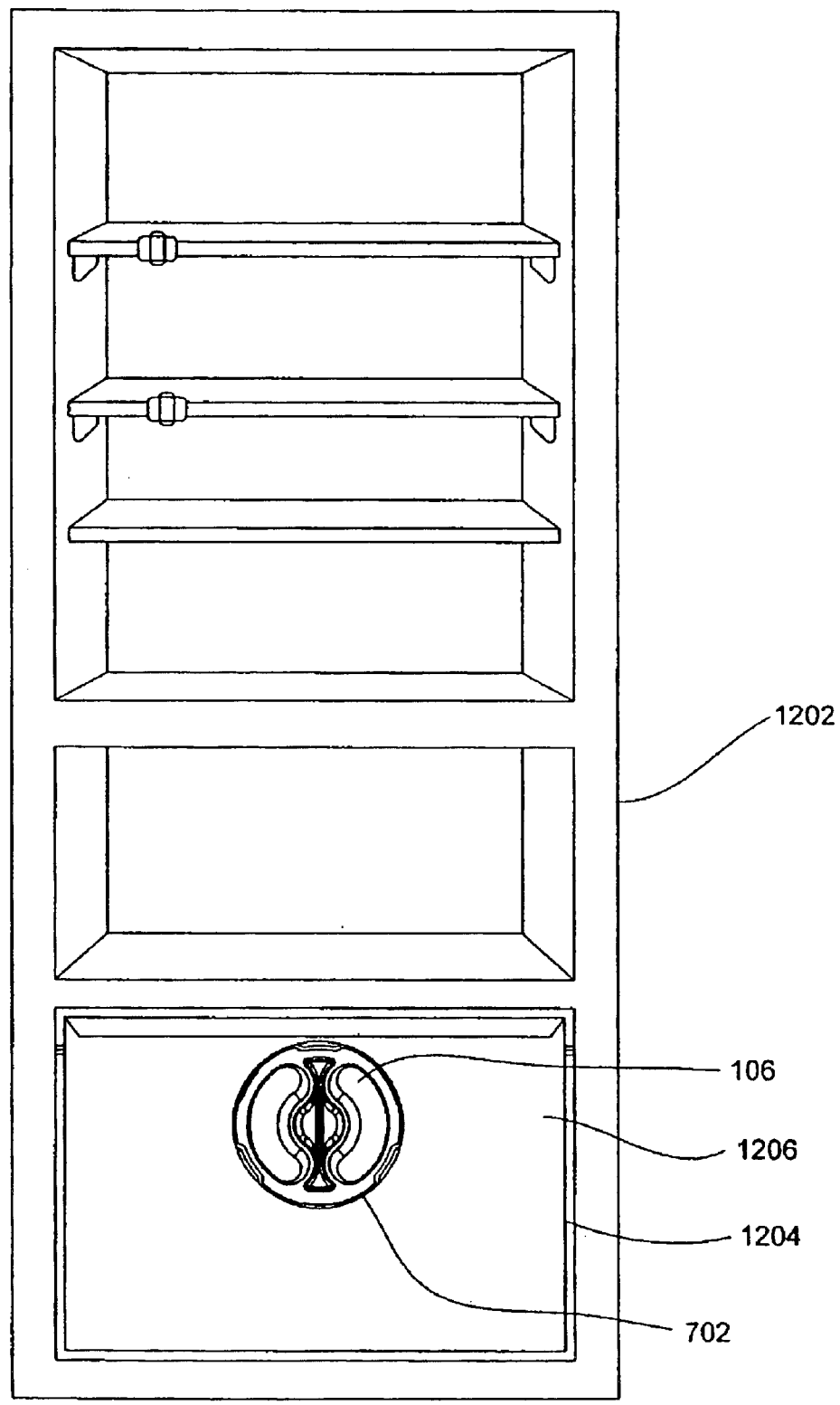
FIG. 12 is a front view of an embodiment of a refrigerator having a compartment with an embodiment of the filter of the invention.

FIG. 12 shows a refrigerator 1202 having a storage compartment 1204. In the embodiment shown in FIG. 12, a filter 106 is coupled to the front surface 1206 of the storage compartment 1204 within a refrigerator 1202. The storage compartment is 1204 has a filter opening 702 in accordance with the filter opening 702 described above with regards to FIGS. 7–11. Although in FIG. 12, the filter opening 702 and filter 106 are located on the front surface 1206 of the storage compartment, in alternate embodiments the filter 106 may be coupled to the refrigerator 1202 or storage compartment 1204 in various locations.

One chamber of the filter contains an ethylene absorbing compound. As noted above in the background section, ethylene control products and methods of producing ethylene absorbing compounds are well know in the art. For specific examples of known methods of producing permanganate impregnated crystalline structures see U.S. Pat. Nos. 5,278,112 to Klatte, U.S. Pat. No. 5,567,405 to Klatte et al. and U.S. Pat. No. 3,049,399 to Gamson, et al., the contents of which are both incorporated herein by reference Further examples of the crystalline structure can include by way of example of Zeolite, molar clay, alumina, silica-alumina, silica gel, activated bauxite, and activated clay and/or other porous substances that can be adequately impregnated.

In one class of embodiments disclosed is a process for impregnating Zeolite crystals (for example, crystals having size 0.125 inch.times.0.10 inch, 0.25 inch.times.0.125 inch, 0.125 inch.times.0.50 inch, or 0.50 inch.times.0.75 inch) with potassium permanganate, and the product of such process. One embodiment of such process, for producing Zeolite crystals uniformly impregnated with potassium permanganate, with a 4% potassium permanganate content and a 15% moisture content, includes the steps of initially dehydrating the Zeolite crystals to have about 5% moisture content, then mixing the dehydrated Zeolite crystals with potassium permanganate crystals (preferably with a weight ratio P/T substantially equal to 4%, where P is the potassium permanganate weight and T is the total weight of the final product of the process), then immersing the crystal mixture in (or spraying the mixture with) water at about 190.degree. F., thoroughly mixing the resulting slurry, and then air drying the mixed slurry to produce potassium permanganate-impregnated Zeolite crystals having about 15% moisture content. Typically, the process employs four pounds of potassium permanganate and fifteen pounds of water for every 86 pounds of dehydrated (5% moisture) Zeolite crystals, and this mixture (105 pounds) is dried to produce 100 pounds of permanganate-impregnated Zeolite crystals having about 15% moisture content.

Variations on the embodiment described above also produce Zeolite crystals or other materials uniformly impregnated with potassium permanganate, or other permanganates having a potassium permanganate content of X%, where X is greater than 4, and is preferably in the range from 8 to 10. In such variations, the dehydrated Zeolite crystals are mixed with solid potassium permanganate with a weight ratio P/T substantially equal to X%, where P is the potassium permanganate weight and T is the total weight of the final product of the process.

In variations on any of the above-described embodiments, permanganate other than potassium permanganate (such as permanganate of sodium, magnesium, calcium, barium, or lithium) can be employed to impregnate the Zeolite crystals. Additionally, the permanganates can be impregnated into various other crystalline structures such as molar clay and the like as identified above.

In another variation, by way of example of the described embodiment, Zeolite crystals or other materials are immersed in (or sprayed with) aqueous potassium permanganate or other permanganate, preferably at a temperature of approximately 190 degrees F., (having permanganate concentration in the range from about 10% to about 20%), where the weight of aqueous potassium permanganate is about 10% of the weight of the final product of the process. The crystals (after they are dried) will be uniformly impregnated with about a 1% concentration of potassium permanganate.

In yet another variation on the described embodiment, Zeolite crystals or other material are immersed in (or sprayed with) supersaturated aqueous potassium permanganate, or other permanganate, (having permanganate concentration of 20% or higher) at 190.degree. F., where the weight of aqueous potassium permanganate is about 10% of the weight of the final product of the process. The Zeolite crystals (after they are dried) are uniformly impregnated with a concentration of potassium permanganate greater than 1%.

For many applications (including air and water filtration applications), the desired concentration of potassium permanganate, or other permanganate, impregnated in Zeolite crystals or other materials is in the range from about 1% to about 4% (or from about 1%) to about 8% or 10%).

A second chamber of the filter, or in an alternate embodiment in the same chamber as the ethylene control compound is in, contains a moisture absorbing compound and $CO_2$ generating compound By way of example of the combination of calcium chloride and Zeolite or other material as described above acts as a desiccant. The anhydrous calcium chloride is unstable in the presence of water. When mixed with water, the crystals will absorb the water, in a known manner, by incorporating the water molecules into their solid lattice—four water molecules to each calcium atom. The resulting crystals of calcium chloride tetrahydrate are stable in contact with water. Although the embodiment described above employs calcium chloride as a desiccant, various other compounds know in the art which absorb water may also be used.

In one embodiment, by way of example of, the carbon dioxide generating compound is a combination of powered citric acid and sodium bicarbonate. Since citric acid is an acid, citric acid has reaction tendencies and chemical properties are similar to most other acids, mostly when concerning bases. Acids react with bases and with metals. The reaction of citric acid and sodium bicarbonate is a typical Acid-Base reaction. In this reaction citric acid donates its protons and reacts with sodium bicarbonate in the presence of water, which may be collected by the calcium chloride. The by-products of this reaction is sodium citrate, carbon dioxide, and water. The water is adsorbed by Zeolite or other material and carbon dioxide is released into the container.

In one embodiment the contents of one chamber of the filter are five percent powdered or crystalline citric acid, five percent powered sodium bicarbonate, one-half percent powdered or crystalline calcium chloride and eighty-nine and one-half percent Zeolite crystals or other material. These materials are dry blended together to a uniform homogeneity and placed in the filter chamber. In alternate embodiments, the ratio of the citric acid and sodium bicarbonate to Zeolite can be between 10 to 90 or from 90 to 10 respectively. As noted above, in still further alternate embodiments, the desiccant and carbon dioxide emitting compounds can be combined with the ethylene absorbing compound.

After the compounds are place in the chamber or chambers of the upper portion of the filter, the Tyvek® or other similar material lower portion of the filter is sealed to the upper portion of the filter and the filter is ready for use.

Although the invention has been described above with particularity, this was merely to teach one of ordinary skill in the art how to make and use the invention. Many modifications will fall within the scope of the invention, as that scope is defined by the following claims.

What is claimed is:

1. A food preserving apparatus, comprising:
a filter adapted to couple to at least one of a lid, a container and a flexible bag, the filter including a shape complimentary to a first keyed aperture;
wherein the filter is adapted to be accepted by a second keyed aperture of at least one of the lid and the container;
wherein the filter contains a food preserving substance; and
wherein the food preserving substance is at least one of an ethylene absorbing substance and a $CO_2$ generating substance.

2. The apparatus of claim 1 wherein:
the filter has at least one ventilation aperture.

3. The apparatus of claim 1 wherein:
the filter has at least one chamber.

4. The apparatus of claim 3 wherein:
the at least one chamber is kidney-shaped.

5. The apparatus of claim 1 wherein:
the filter is comprised of an upper portion and a lower portion, the lower portion including a water impervious, vapor permeable material.

6. The apparatus of claim 1 wherein:
the filter is made of one of flexible plastic and rigid plastic.

7. The apparatus of claim 1 wherein:
the ethylene absorbing substance includes Zeolite and potassium permanganate.

8. The apparatus of claim 1 wherein:
the $CO_2$ producing substance includes citric acid, sodium bicarbonate and a desiccant.

9. The apparatus of claim 1 wherein:
the shape includes at least one slot adapted to align with a complementary structure on the second keyed aperture.

10. The apparatus of claim 1 wherein:
the second keyed aperture includes at least one mating flange.

11. The apparatus of claim 1 wherein:
the second keyed aperture includes at least one mating flange and at least one registration protrusion.

12. The apparatus of claim 1 wherein:
the second keyed aperture includes two mating flanges and one registration protrusion.

13. The apparatus of claim 1 wherein:
the second keyed aperture includes a perimeter seating lip.

14. The apparatus of claim 13 wherein:
the perimeter seating lip defines at least one protrusion.

15. The apparatus of claim 1 wherein:
the second keyed aperture includes at least one mating flange and the shape includes at least one registration slot.

16. The apparatus of claim 15 wherein:
the number of registration slots is one less than the number of mating flanges.

17. The apparatus of claim 1 wherein:
the second keyed aperture includes three mating flanges and three registration protrusions; and
wherein the shape includes three registration slots.

18. The apparatus of claim 1 wherein:
the filter includes a handle.

19. The apparatus of claim 1 wherein:
the food preservation substance includes a substance that absorbs ethylene gas.

20. The apparatus of claim 1 wherein:
the food preservation substance includes a permanganate.

21. The apparatus of claim 1 wherein:
the food preservation substance includes a potassium permanganate.

22. The apparatus of claim 1 wherein:
the preservation substance includes at least one of a salt and a quaternary ammonium cation.

23. A food preserving lid adapted to couple to a filter, comprising:
a first keyed aperture adapted to accept the filter; and
wherein the filter defines a shape adapted to be complimentary to a second keyed aperture;
wherein the filter contains a food preserving substance; and
wherein the food preserving substance is at least one of an ethylene absorbing substance and a $CO_2$ generating substance.

24. The food preserving lid of claim 23 wherein:
the food preserving substance includes a substance that absorbs ethylene gas.

25. The food preserving lid of claim 23 wherein:
the food preserving substance includes a permanganate.

26. The food preserving lid of claim 23 wherein:

the food preserving substance includes potassium permanganate.

27. The food preserving lid of claim 23 wherein:

the food preserving substance includes at least one of a salt and a quaternary ammonium cation.

28. The food preserving lid of claim 23 wherein:

the ethylene absorbing substance includes Zeolite and potassium permanganate.

29. The food preserving lid of claim 23 wherein:

the $CO_2$ generating substance includes citric acid, sodium bicarbonate and a desiccant.

30. The food preserving lid of claim 23 wherein:

the filter is comprised of an upper portion and a lower portion, the lower portion including a water impervious, vapor permeable material.

31. The food preserving lid of claim 23 wherein:

the lid is made of one of flexible plastic and rigid plastic.

32. The food preserving lid of claim 23 wherein:

the shape includes at least one slot adapted to align with at least one complementary structure on at least one of the first keyed aperture and the second keyed aperture.

33. The food preserving lid of claim 23 wherein:

the first keyed aperture includes at least one mating flange.

34. The food preserving lid of claim 23 wherein:

the first keyed aperture includes at least one mating flange and at least one registration protrusion.

35. The food preserving lid of claim 23 wherein;

the first keyed aperture includes two mating flanges and one registration protrusion.

36. The food preserving lid of claim 23 wherein:

the first keyed aperture includes a perimeter seating lip.

37. The food preserving lid of claim 36 wherein:

the perimeter seating lip defines at least one protrusion.

38. The food preserving lid of claim 23 wherein:

the first keyed aperture includes at least one mating flange and the shape includes at least one registration slot.

39. The food preserving lid of claim 38 wherein:

the number of registration slots is one less than the number of mating flanges.

* * * * *